United States Patent [19]

Melkonian

[11] 4,029,736
[45] June 14, 1977

[54] PROCESSING PEARLITE TO OBTAIN METAL SILICATES

[76] Inventor: Garegin Sarkisovich Melkonian, ulitsa Barekamutiana, 26, kv. 11, Erevan, U.S.S.R.

[22] Filed: June 7, 1973

[21] Appl. No.: 367,876

[52] U.S. Cl. .............................. 423/118; 423/326; 423/331; 423/332; 423/333
[51] Int. Cl.[2] ....................................... C01B 33/26
[58] Field of Search .......... 423/332, 118, 331, 326, 423/333, 328

[56] References Cited

UNITED STATES PATENTS

| | | | |
|---|---|---|---|
| 1,945,534 | 2/1934 | Rembert | 423/331 |
| 2,047,614 | 7/1936 | Cavezzale | 423/332 |
| 2,078,836 | 4/1937 | Carter | 423/332 |
| 3,101,251 | 8/1963 | Howell | 423/118 |
| 3,515,682 | 6/1970 | Flank et al. | 423/118 X |

Primary Examiner—O. R. Vertiz
Assistant Examiner—Brian E. Hearn

[57] ABSTRACT

Processing of pearlite by treating the same with an alkaline solution having a concentration of 40–140 g/l taken in an amount which brings the ratio of the liquid and solid phases to (0.7–1.5) : 1 and then separating by filtration the water glass, obtained in the process of heat treatment, from the residue formed.

8 Claims, 1 Drawing Figure

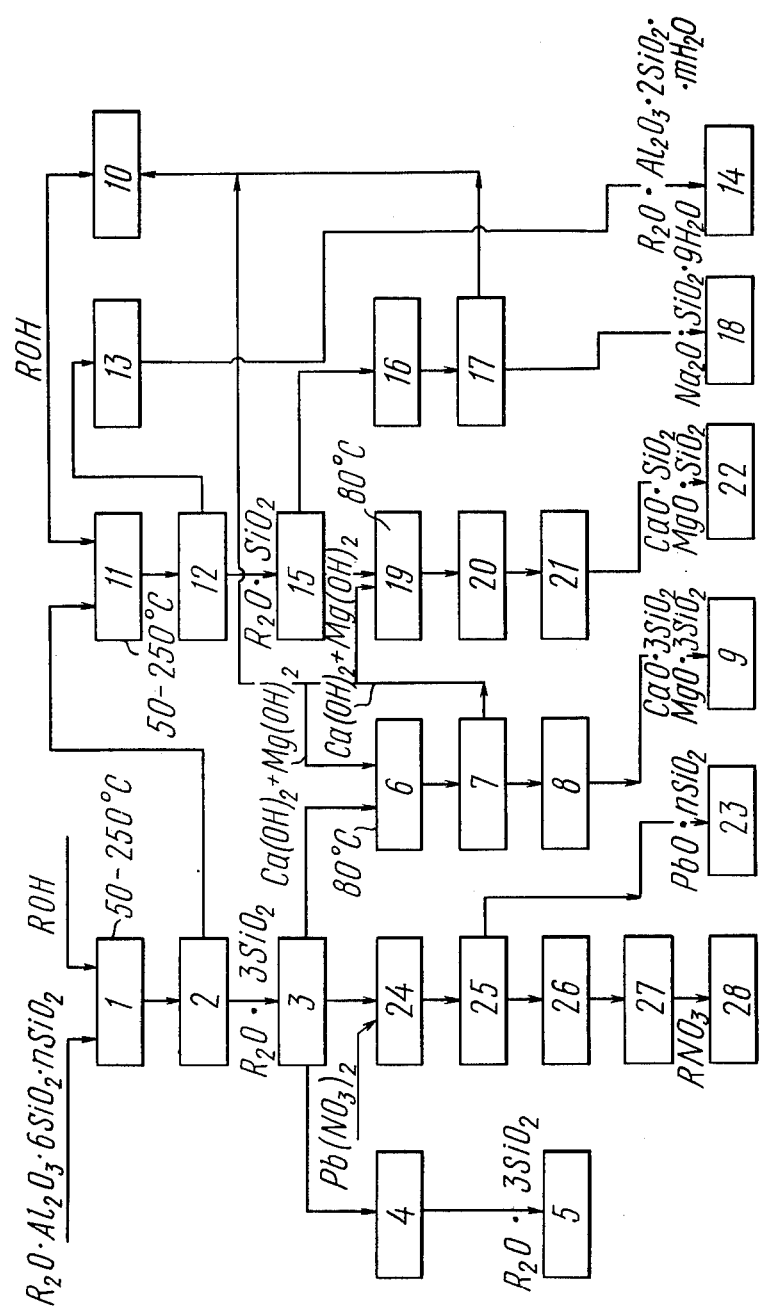

PROCESSING PEARLITE TO OBTAIN METAL SILICATES

The present invention relates to a method of processing pearlite with the object of producing alkaline and alkaliearth metals used in building as adhesive materials and binders for concrete, in the textile industry for bleaching fabrics, in the chemical industry for the synthesis of adsorbents (zeolites) as well as in preparing detergents, fillers for paper, rubber, plastics and other materials.

A method is known of processing pearlite, wherein pearlite rock is ground to a particle size of 0.1 mm and treated for a period of 30–40 minutes with a sodium hydroxide solution having a concentration of 100–200 g/l. After the pulp obtained is filtered sodium concentrate precipitates and sodium metasilicate is then isolated from the filtrate. (cf., for example, USSR Inventor's Certificate No. 164,584, Cl. 12i, 33$^{32}$).

Also known is a method of producing silicates of alkali metals by mixing natural quartz sand with carbonates of alkali metals followed by heat treatment of said mixture in a glass furnace at a temperature of 1400°–1500° C. The blocks of soluble glass thus obtained are first ground and then dissolved in water in autoclaves for a period of 5–7 hours at a temperature of 180° C.

The pulp is then filtered (cf., for example, "The Soluble Glass" by P. N. Grigoreyev and M. A. Matveyev - State Publishing House for Literature on Building materials, Moscow, 1956).

The processing of the starting materials at high temperatures, grinding of the product obtained (the silicate block) and dissolving the same in an autoclave are labor-consuming and costly operations. Besides, due to the contamination of the starting material (quartz sand) the product obtained contains undesirable admixtures (such as the oxides of iron, titanium vanadium, etc.) which fact markedly limits the application of said product in glass manufacture, particularly, in the manufacture of colorless glass.

It is an object of the present invention to eliminate the aforementioned disadvantages.

A further and more specific object of the present invention is to provide a method of processing pearlite by the use of such reagents and technique which make it possible to simplify the technological process, reduce its cost and produce high quality silicate products.

This and other objects have been accomplished by a method of processing pearlite wherein perlite is reacted with an alkali metal hydroxide solution followed by heat treatment of the pulp obtained in an autoclave and, according to the invention, in the processing of pearlite use is made of an alkaline solution with a concentration of 40–140 g/l taken in an amount which brings the ratio of the liquid and solid phases to (0.7–1.5):1 and water glass obtained in the process of heat treatment is then separated by filtration from the residue formed.

The residue obtained on filtering the water glass can be treated with an alkaline solution having a concentration of 150–250 g/l taken in an amount which brings the ratio of the liquid and solid phases to 1.5:1, at a temperature not lower than 50° C and the pulp obtained filtered to separate the residue of sodium metasilicate. The residue obtained after filtering the water glass can be treated with a sodium hydroxide solution having a concentration of 150–250 g/l taken in an amount which brings the ratio of the liquid and solid phases to (4–8):1, at a temperature not lower than 50° C, the pulp obtained filtered and the filtrate cooled to a temperature of below 15° C until crystals of sodium metasilicate nonahydrate are formed which are then filtered off. To produce alkali metal aluminosilicates the residue obtained on filtration of sodium metasilicates can be dried to a 5% liquid content.

To produce the silicates of alkaline-earth metals it is expedient to react the filtrates, obtained by the aforementioned methods, with hydroxides of bivalent metals or lead nitrate taken in equivalent ratios, heat the pulp obtained to the boiling temperature and then separate by filtration the precipitated silicates of alkaline earth metals or lead.

The nature of the present invention is as follows.

The advantage of using pearlite to produce silicates of alkali metals by subjecting pearlite to heat treatment is based on the high reactability of pearlite. Pearlite is a glassy rock of a volcanic origin consisting essentially (98–99%) of an amorphous mass and 1–2% of separate minerals incorporated in it.

As pearlite has a specific (amorphous) structure, it is possible to split it with an alkaline solution at lower temperatures (not higher than 250° C). The free part of silicon dioxide contained in pearlite amounts to 30% of the initial rock and is bound with the alkali of the solution to form sodium trisilicate if the alkali of the solution is proportioned to the silica of the rock as 3 to 1.

The process of preparing sodium metasilicate based on the residue obtained on filtration of water glass proceeds faster than the conventional process wherein sodium metasilicate is prepared from silicate-block. This is also connected with the distinctive structure of pearlite.

The world's resources of the starting material for producing silicates of alkali metals, i.e. pearlite are almost inexhaustible. The extraction of pearlite is comparatively not laborious as its deposits are located on the earth surface. Pearlite is a unique raw material.

Pearlite consists essentially of (% by weight): $SiO_2$ – 73, $Al_2O_3$ – 15, $R_2O$ – 8. The deleterious dyeing admixtures, $Fe_2O_3$ and $TiO_2$ contained in pearlite within the range of 0.2–0.7% remain in the residue on filtering and therefore the products obtained-water glass and sodium metasilicate are almost free of admixtures.

Pearlite is homogeneous and does not require neutralization.

Alkali metal aluminosilicates obtained in the form of a residue in the process of heat treatment of pearlite constituting 40% of the starting rock can be used as permutite to purify water, as well as a starting material in the production of alumina and soda.

A valuable product is also sodium metasilicate nonahydrate which is employed as a bleaching agent in the textile industry, a detergent and as a starting material in the production of adsorbents.

This product is obtained on cooling below 15° C the alkaline-siliceous solution obtained in the best - alkaline treatment of the residue separated in the process of filtering water glass.

The specific feature of the technique involved in obtaining said product is that it can be precipitated in monocrystalline form from a mixture of a solution of potassium metasilicate and sodium without potassium metasilicate, which fact assures its use in the synthesis of high-purity zeolites.

The purity of the alkali metal silicates obtained in the hydrothermal processing of pearlite provides for producing silicates of alkaline-earth metals of high purity which property is essential in manufacturing high-quality glass. It is well known that pure carbonates suitable for glass manufacture do not exist in nature.

The silicates of bivalent metals (obtained when the solutions of alkali metal silicates are subjected to the action of oxides of bivalent metals or lead nitrate) can serve as novel starting materials in glass manufacture assuring the production of high-quality glass articles and the stability of the glass manufacture process.

The efficacy of the present method of producing silicates of alkali and alkaline-earth metals is visually disclosed in the accompanying flow sheet of processing of pearlite. Ground pearlite ($R_2O.Al_2O_3.6SiO_2nSiO_2$) is mixed with a solution of alkali metal hydroxide (ROH), the ratio of the liquid and solid phases being (0.7–1.5) : 1, and is then subjected to hydrothermal treatment 1 at a temperature of 50°–250° C, whereupon it is filtered through vacuum drum filters 2.

The filtrate-solution, $R_2O.3S:O_2$ 3 after being evaporated 4 to a specific weight of 1.5 is ready for use as a commercial product 5 or may be sent for causticizing 6 with hydroxide $Ca(OH)_2.Mg(OH)_2$ or calcined dolomite (CaO.MgO) at a temperature of 80° C. The pulp obtained after caustification of water glass is filtered on a vacuum drum filter 7 and the residue, $CaO.3SiO_2$,- $MgO.3SiO_2$ after being dried 8 is ready for use as a commercial product 9. The filtrate of alkali metal hydroxides ROH, on being subjected to evaporation 10 is recycled.

The residue obtained after filtration of water glass is passed for a repeated hydrothermal treatment 11 at a temperature of 50°–250° C, the dose of the alkaline solution calculated as $R_2O:SiO_2$ of the rock equals 1.5, whereupon it is filtered and washed on a vacuum drum filter 12. On drying the residue 13 is ready for use as a commercial product 14 permutite ($R_2O.Al_2O_3 .2SiO_2$. m $H_2O$).

The crystals of sodium metasilicate nonahydrate are formed in crystallizer 16 after cooling a part of the filtrate 15 to a temperature of below 15° C which part is separated by filtration on centrifuge 17 whereupon it is ready for use as a commercial product 18. The mother liquor obtained during centrifugation 17 is then evaporated 10 and recycled. The rest of the filtrate 15 is subjected to causticizing 19 with a solution of Ca-$(OH)_2$ and $Mg(OH)_2$ at a temperature of 80° C. The residue obtained during causticizing 19 is separated by filtration on a vacuum drum filter 20 and after being dried 21 becomes a commercial product 22.

High-modulus lead silicate $PbO.nSiO_2$ 23 can be obtained by reacting water glass 3 with an equivalent amount of a solution of lead nitrate $Pb(NO_3)_2$ in reactor 24 followed by filtration 25. The filtrate is subjected to crystallization by the process of evaporation 26, the resultant product after being separated by filtration 27 is ready for sale as saltpeter ($RNO_3$) 28. Thus, by subjecting pearlite to hydrothermal-alkaline processing, the following materials are obtained: water glass (sodium or potassium), sodium metasilicate nonahydrate, calcium metasilicate, magnesium metasilicate, calcium trisilicate, magnesium trisilicate alkali metal aluminosilicates, high modulus lead silicates and sodium or potassium nitrate.

For a better understanding of the present invention by those skilled in the art, the following examples of the embodiment of the present method are given by way of illustration.

Example 1.

Preparation of water glass ($Na_2O.3SiO_2$).

Pearlite having the following chemical composition (% by weight): $SiO_2$ — 73.06, $Al_2O_3$ — 13.03, $Fe_2O_3$ — 1.13, CaO — 0.9, MgO — 0.3, $R_2O$ — 7.32, losses of moisture through calcination — 3.85, is ground to a finess of 100%–0.25 mm and mixed with a solution of sodium hydroxide having a concentration of $Na_2O$ 115 g/l, the ratio of the liquid and solid phases being 1.2:1. The pulp thus obtained is processed in an autoclave at a temperature of 150° C, for 60 minutes and is then cooled to a temperature of up to 80° C and filtered. The chemical composition of the filtrate (water glass) is : $Na_2O$ — 97.6 g/l, $SiO_2$ — 286 g/l; molecular ratio $SiO_2$ : $Na_2O$ = 3.04.

The chemical composition of the residue is (% by weight): $SiO_2$ — 58.4, $Al_2O_3$ — 18.84, $Fe_2O_3$ — 1.14, $R_2O$ — 10.94, CaO — 1.18, MgO — 0.5, losses of moisture through calcination. —9.

EXAMPLE 2.

Preparation of sodium metasilicate $Na_2O.SiO_2$. After the liquid glass is filtered off, the residue having the following chemical composition (% by weight): $SiO_2$ — 58.4%, $Al_2O_3$ — 18.84, $Fe_2O_3$ — 1.14, $R_2O$ — 10.94, CaO — 1.18, MgO — 0.5; losses of moisture through calcination —9, is mixed with a solution of sodium hydroxide having a concentration of $Na_2O$—200 g/l, the ratio of the liquid and solid phases being 1.5:1. The mixture is then processed in an autoclave at a temperature of 130° C for 60 minutes, whereupon the temperature of the autoclave pulp is lowered to 80° C and the pulp is filtered. The chemical composition of the filtrate (sodium metasilicate) is: $Na_2O$ — 196 g/l, $SiO_2$ — 190 g/l; molecular ratio $SiO_2O$ — 1:1.

The chemical composition of the residue is (% by weight): SiO — 37.88, $Al_2O_3$ — 28.47, $Fe_2O_3$ — 1.05%, $R_2O$ — 15.48, CaO — 1.86, MgO — 0.5; losses through calcination 15.6.

EXAMPLE 3.

Preparation of sodium metasilicate nonahydrate.

A residue having the following chemical composition (% by weight): $SiO_2$ — 58.4, $Al_2O_3$ — 18.84, $Fe_2O_3$ — 1.14, $R_2O$ — 10.94, CaO — 1.18, MgO — 0.5, losses of moisture through calcination — 9, is mixed with a solution of sodium hydroxide having a concentration of $Na_2O$ — 200 g/l, at a ratio of the liquid and solid phases 8:1 and then processed in an autoclave at a temperature of 130° C for 30 minutes, whereupon the temperature of the autoclave pulp is lowered to 80° C and the pulp is filtered. The chemical composition of the filtrate (an alkaline - - siliceous solution) is : $Na_2O$ — 182 g/l, $SiO_2$ — 108.5 g/l the chemical composition of the residue is (% by weight): $SiO_2$ — 38.4, $Al_2O_3$ — 27.01, $Fe_2O_3$ — 1.55, $R_2O$ — 13.8, CaO — 1.69, MgO — 0.6; losses through calcination — plus moisture — —16.85. The filtrate of the alkaline-siliceous solution is cooled below 15° C to precipitate sodium metasilicate nonahydrate ($Na_2O.SiO_2.9H_2O$), which is separated from the mother liquor.

EXAMPLE 4.

The preparation of calcium metasilicate.

Calcium metasilicate is prepared by reacting a solution of sodium metasilicate and lime according to the following equation: $Na_2O \cdot SiO_2 + CaO + aq = CaO \cdot SiO_2 + Na_2O + aq$, where "aq" is water.

To prepare 10 kg of calcium silicate from a solution of sodium metasilicate having a composition $SiO_2$ — 200 g/l, $Na_2O$ — 200 g/l, 26 l of a solution of sodium metasilicates are taken, whereto an equivalent amount of CaO (4.8 kg) is added and the mixture is then heated with stirring up to 80° C and maintained at this temperature for 40 minutes. The pulp is then filtered and washed. The residue ($CaO \cdot SiO_2$) after being dried, is a commercial product ready for use.

Magnesium metasilicate ($MgO \cdot SiO_2$) can be prepared in a similar way if CaO is substituted by MgO taken in an amount of 4 kg and 30 l of the solution of sodium metasilicate are employed.

EXAMPLE 5.

Preparation of calcium trisilicate.

The preparation of calcium trisilicate is based on reacting a solution of sodium trisilicate (sodium water glass) and lime according to the reaction: $Na_2O \cdot 3SiO_2 + CaOaq = CaO \cdot 3SiO_2 + + Na_2O + aq$ To prepare 10 kg of calcium trisilicate from a solution of sodium trisilicate having a chemical composition: $SiO_2$ — — 286 g/l, $Na_2O$ — 98 g/l, 38 l of sodium trisilicate are taken and an equivalent amount, viz. 2.4 kg of CaO is added and the mixture is heated up to 80° C with stirring. The pulp obtained is maintained at this temperature for 40 minutes and is then filtered and washed. The residue, $CaO \cdot 3SiO_2$, after being dried, is a commercial product ready for use.

EXAMPLE 6.

Preparation of high-modulus lead silicate

High-modulus lead silicate is prepared by reacting solutions of sodium trisilicate and lead nitrate:

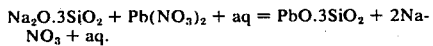

$Na_2O \cdot 3SiO_2 + Pb(NO_3)_2 + aq = PbO \cdot 3SiO_2 + 2NaNO_3 + aq.$

To prepare 10 kg of high-modulus lead silicate from a solution of sodium trisilicate having the chemical composition: $SiO_2$ — 286 g/l and $Na_2O$ — 98 g/l, 22.4 liters of high-modulus sodium silicate are taken and while stirring continuously an equivalent amount (8263 kg) of lead nitrate is added. The pulp thus obtained is maintained at a temperature of 50°–60° C for 30 minutes and is then filtered and washed. The residue $PbO \cdot 3SiO_2$ after being dried, becomes a commercial product.

We claim:

1. A method of processing pearlite comprising treating pearlite with an alkali metal hydroxide solution having a concentration of 40–140 g/l taken in an amount which brings the ratio of the liquid and solid phases to (0.7–1.5) : 1, to form a pulp, hydrothermally treating the obtained pulp in an autoclave to form water glass and separating the water glass from the residue by filtration, treating the residue with an alkali metal hydroxide solution having a concentration of 150–200 g/l taken in an amount which brings the ratio of the liquid and solid phases to 0.5:1, at a temperature not below 50° C, followed by filtering to separate a residue of sodium metasilicate.

2. The method of claim 1, wherein the residue, separated upon filtering sodium metasilicate, containing alkali metal aluminosilicates is subjected to drying.

3. The method of claim 1, wherein the filtrate, obtained on separating the sodium metasilicate by filtration is reacted with hydroxides of alkaline earth metals taken in equivalent ratios to form a pulp, and the pulp is heated to the boiling temperature, whereupon the precipitated silicates of alkaline earth metals are separated by filtration.

4. The method of claim 1, wherein the filtrate, obtained on separating the sodium metasilicate by filtration, is reacted with lead nitrate taken in an equivalent ratio to form a pulp, and the pulp is heated to the boiling temperature, whereupon the precipitated lead silicates are separated by filtration.

5. A method of processing pearlite comprising treating pearlite with an alkali metal hydroxide solution have a concentration of 40–140 g/l taken in an amount which brings the ratio of the liquid and solid phases to (0.7–1.5) : 1, to form a pulp, hydrothermally treating the obtained pulp in an autoclave to form water glass and separating the water glass from the residue by filtration, treating the residue with a sodium hydroxide solution having a concentration of 150–250 g/l taken in an amount which brings the ratio of the liquid and solid phases to (4–8) : 1 at a temperature not below 50° C, to form a pulp, filtering the pulp and cooling the filtrate obtained by said filtration to a temperature below 15° C until crystals of sodium metasilicate nonahydrate are formed and separating said crystals by filtration.

6. The method of claim 5 wherein the residue, separated upon filtering sodium metasilicate nonahydrate, containing alkali metal aluminosilicates is subjected to drying.

7. The method of claim 5, wherein the filtrate, obtained on separating the sodium metasilicate nonahydrate by filtration, is reacted with hydroxides of alkaline earth taken in equivalent ratios to form a pulp, and the pulp is heated to the boiling temperature whereupon the precipitate silicates of alkaline earth metals are separated by filtration.

8. The method of claim 5, wherein the filtrate, obtained on separating the sodium metasilicate nonahydrate by filtration, is reacted with lead nitrate taken in an equivalent ratio to form a pulp, and the pulp is heated to the boiling temperature, whereupon the precipitated lead silicates are separated by filtration.

* * * * *